United States Patent
Takeshita (10) Patent No.: US 8,502,884 B2
(45) Date of Patent: Aug. 6, 2013

(54) IMAGE PROCESSING APPARATUS, IMAGE-CAPTURING APPARATUS, AND RECORDING MEDIUM STORING IMAGE PROCESSING PROGRAM

(75) Inventor: Tetsuya Takeshita, Kamakura (JP)

(73) Assignee: Nikon Corporation, Tokyo (JP)

( * ) Notice: Subject to any disclaimer, the term of this patent is extended or adjusted under 35 U.S.C. 154(b) by 1075 days.

(21) Appl. No.: 12/457,632

(22) Filed: Jun. 17, 2009

(65) Prior Publication Data
US 2010/0007900 A1 Jan. 14, 2010

(30) Foreign Application Priority Data
Jul. 8, 2008 (JP) .................................. 2008-178221

(51) Int. Cl.
*H04N 9/73* (2006.01)
*H04N 5/225* (2006.01)

(52) U.S. Cl.
USPC ..................................... 348/226.1; 348/222.1

(58) Field of Classification Search
USPC ............................... 348/226.1, 222.1; 358/1.9
See application file for complete search history.

(56) References Cited

U.S. PATENT DOCUMENTS

| | | | |
|---|---|---|---|
| 7,656,436 B2* | 2/2010 | Kinoshita et al. | 348/226.1 |
| 7,675,552 B2* | 3/2010 | Ono et al. | 348/228.1 |
| 8,068,148 B2* | 11/2011 | Noyes et al. | 348/226.1 |
| 8,089,524 B2* | 1/2012 | Urisaka | 348/222.1 |
| 2005/0276596 A1* | 12/2005 | Chan et al. | 396/296 |
| 2007/0126893 A1 | 6/2007 | Wang et al. | |
| 2008/0101721 A1 | 5/2008 | Mori | |
| 2008/0303920 A1* | 12/2008 | Kinoshita | 348/226.1 |

FOREIGN PATENT DOCUMENTS

| | | |
|---|---|---|
| CN | 1946143 A | 4/2007 |
| GB | 2 284 318 A | 5/1995 |
| JP | A 2000-23040 | 1/2000 |

OTHER PUBLICATIONS

Oct. 16, 2009 Search Report issued in European Application No. 09008220.7.

* cited by examiner

*Primary Examiner* — Tuan Ho
*Assistant Examiner* — Fayez Bhuiyan
(74) *Attorney, Agent, or Firm* — Oliff & Berridge, PLC (57) ABSTRACT

An image processing apparatus can correct band-like unevenness due to flickering with a simple arrangement. For this purpose, the image processing apparatus includes a detecting unit which detects, in the image to be processed, a band-like unevenness occurring along a direction substantially perpendicular to the scanning direction of the imaging sensor included in the image-capturing apparatus used when performing image-capturing of the image, a calculating unit which calculates a correction amount to correct the band-like unevenness, and a correcting unit which corrects the band-like unevenness in the image based on the correction amount.

12 Claims, 9 Drawing Sheets

IMAGE PROCESSING APPARATUS, IMAGE-CAPTURING APPARATUS, AND RECORDING MEDIUM STORING IMAGE PROCESSING PROGRAM

CROSS REFERENCE TO THE RELATED APPLICATIONS

This application is based upon and claims the benefit of priority from Japanese Patent Application No. 2008-178221, filed on Jul. 8, 2008, the entire contents of which are incorporated herein by reference.

BACKGROUND

1. Field

The present application relates to an image processing apparatus which performs an image processing on an image to be processed, an image-capturing apparatus including the image processing apparatus, and an image processing program which performs an image processing on an image to be processed.

2. Description of the Related Art

In recent years, there has been a significant advance in sensitivity of image-capturing apparatuses such as electronic cameras. As a result, shutter speed has also increased, and whereby exposure through a focal shutter or a rolling shutter may be performed in almost the so-called slit exposure state. With slit exposure, it is known that a band-like unevenness occurs due to flickering caused by fluorescent lamps or the like. Therefore, the invention of Japanese Unexamined Patent Application Publication No. 2000-23040, for example, uses the output of both a photometric element and an imaging sensor to correct the band-like unevenness.

In the invention of Japanese Unexamined Patent Application Publication No. 2000-23040, however, it is necessary to prepare two sensors, namely a photometric element and an imaging sensor, as well as to control the two sensors in synchronization.

SUMMARY

It is a proposition of the embodiments of the present invention to correct the band-like unevenness due to flickering with a simple arrangement.

In order to achieve the above-mentioned proposition, an image processing apparatus of the embodiments of the present invention includes a detecting unit which detects a band-like unevenness occurring in an image to be processed along a direction substantially perpendicular to a scanning direction of an imaging sensor included in an image-capturing apparatus used when performing image-capturing of the image, a calculating unit which calculates a correction amount to correct the band-like unevenness, and a correcting unit which corrects the band-like unevenness in the image based on the correction amount.

Here, the detecting unit may detect, in the image, the band-like unevenness based on intensity distribution in at least one line of pixel column along the scanning direction, and the calculating unit may calculate the correction amount based on the intensity distribution.

In addition, the image may be made up of a plurality of color components, the detecting unit may detect the band-like unevenness for each of the plurality of color components based on the intensity distribution, and the calculating unit may calculate the correction amount for each of the plurality of color components based on the intensity distribution.

In addition, the calculating unit may perform an approximation of the intensity distribution to a point spread function or a Gauss distribution and may calculate the correction amount based on the intensity distribution after the approximation.

In addition, the calculating unit may provide a predetermined limit value to the correction amount.

In addition, the calculating unit may determine the limit value based on at least one of the shutter speed and the running speed of a shutter curtain in the image-capturing apparatus when performing image-capturing of the image.

In addition, the detecting unit may detect, in the image, the band-like unevenness for each of a plurality of lines of pixel column along the scanning direction based on the intensity distribution, and the calculating unit may calculate the correction amount for each of the lines of pixel column along a direction substantially perpendicular to the scanning direction based on the intensity distribution.

In addition, the image processing apparatus may further include a second calculating unit which calculates a white balance evaluation value with regard to the image, in which the calculating unit may estimate at least one of the intensity and the color information of the band-like unevenness based on the white balance evaluation value, and may calculate the correction amount based on an estimation result.

In addition, the image processing apparatus may further include the second calculating unit which calculates the white balance evaluation value with regard to the image and a third calculating unit which calculates a second correction amount in order to simultaneously perform correction of the band-like unevenness and a white balance adjustment on the image based on the correction amount and the white balance evaluation value, in which the correcting unit may simultaneously perform correction of the band-like unevenness and the white balance adjustment on the image based on the second correction amount.

In addition, the image processing apparatus may further include an accepting unit which accepts user's operation specifying degree of correction by the correcting unit, in which the calculating unit may calculate the correction amount according to the degree of correction.

Here, an image-capturing apparatus comprising the above-mentioned arrangement with regard to the embodiments of the present invention, and a computer readable recording medium storing an image processing program which represents the arrangement with regard to the embodiments of the present invention in order to realize the image processing on an image data to be processed are also valid as concrete embodiments of the present invention.

DETAILED DESCRIPTION OF THE EMBODIMENTS

First Embodiment

A first embodiment of the present invention will be described below, referring to the drawings. Here, in the first embodiment, description will be provided using an electronic camera comprising an image processing apparatus of the embodiments of the present invention as an example.

Figure 1:
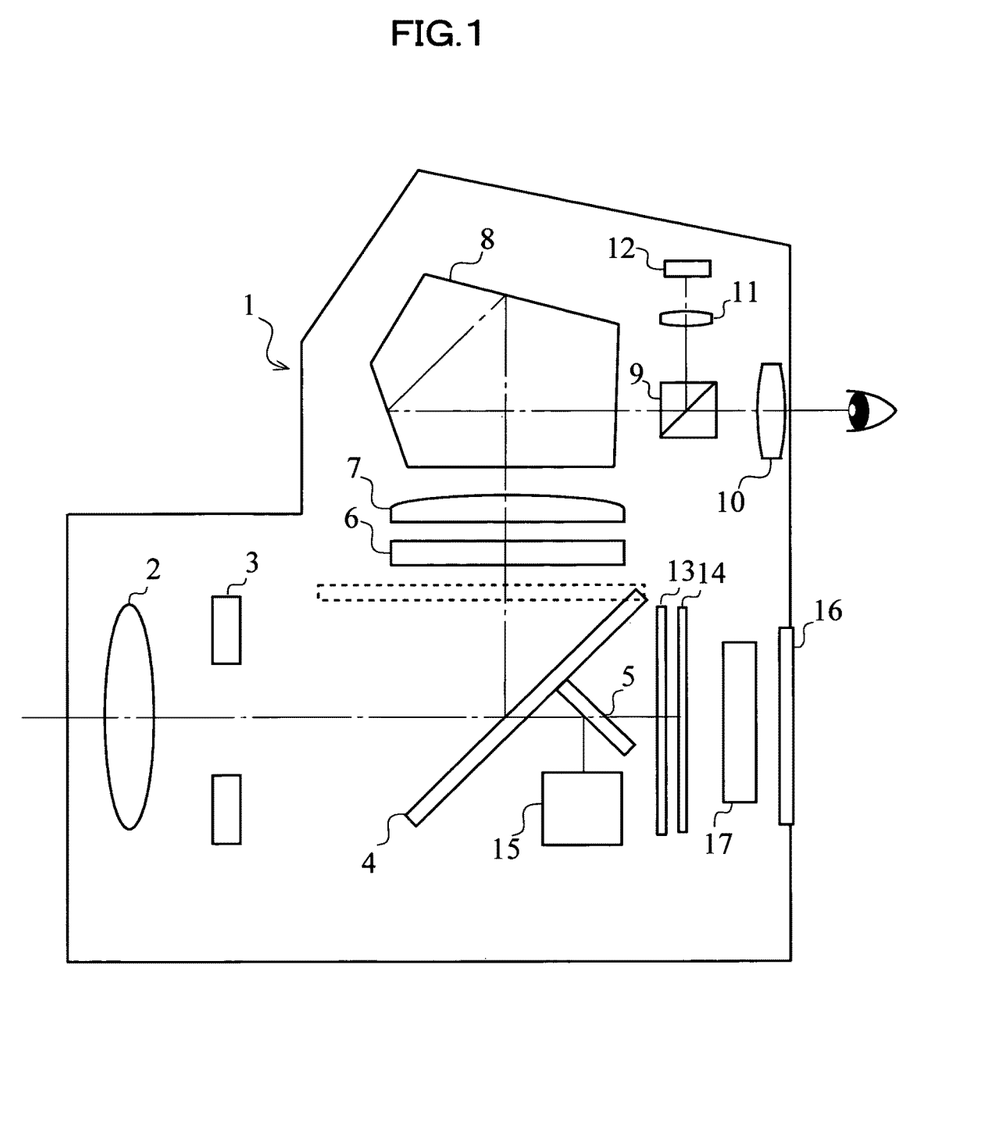
FIG. 1 is a diagram illustrating an arrangement of an electronic camera 1 of a first embodiment.

FIG. 1 illustrates an arrangement of an electronic camera 1 of the first embodiment. As shown in FIG. 1, the electronic camera 1 includes an photographing lens 2, an aperture 3, a quick return mirror 4, a sub mirror 5, a diffusing screen 6, a condenser lens 7, a pentaprism 8, a beam splitter 9, an eyepiece lens 10, an imaging lens 11, a photometry sensor 12, a shutter 13, an imaging sensor 14, and a focus detecting unit 15.

The photometry sensor 12 is, for example, a five-division photometry sensor. In addition, the shutter 13 is a focal plane shutter disposed in front of the imaging sensor 14. The imaging sensor 14 is, for example, a semiconductor device such as a CCD (Charge Coupled Device) or a CMOS (Complementary Metal Oxide Semiconductor). The focus detecting unit 15 performs, for example, phase difference focusing to detect the focus state of the photographing lens 2. In addition, the electronic camera 1 performs contrast focusing based on the brightness detected by the photometry sensor 12 to detect the focus state of the photographing lens 2.

In addition, the electronic camera 1 further includes a monitor 16 such as a liquid crystal monitor which displays images generated by image-capturing, and a controlling part 17 which controls respective units. The controlling part 17 includes a memory (not shown) therein to preliminarily record a program to control respective units.

At the time of non-shooting, in other words, when image-capturing is not being performed, the quick return mirror 4 is arranged at an angle of 45° as shown in FIG. 1. Then, the light flux that passed the photographing lens 2 and the aperture 3 is reflected by the quick return mirror 4 and guided to the eyepiece lens 10 via the diffusing screen 6, the condenser lens 7, the pentaprism 8, and the beam splitter 9. A user checks the composition by viewing the image of the subject through the eyepiece lens 10. In other words, the eyepiece lens 10 functions as a finder. On the other hand, the light flux divided upward by the beam splitter 9 is re-imaged on the imaging plane of the photometry sensor 12 through the imaging lens 11. In addition, the light flux transmitted through the quick return mirror 4 is guided to the focus detecting unit 15 via the sub mirror 5.

On the other hand, when performing image-capturing, the quick return mirror 4 is retracted to the position shown by the dashed line to open the shutter 13, whereby the light flux from the photographing lens 2 is guided to the imaging sensor 14. In other words, the light flux from the photographing lens 2 is not simultaneously guided to both the photometry sensor 12 and the imaging sensor 14, thus the band-like unevenness due to flickering cannot be corrected by driving these two sensors in synchronization.

Figure 2:
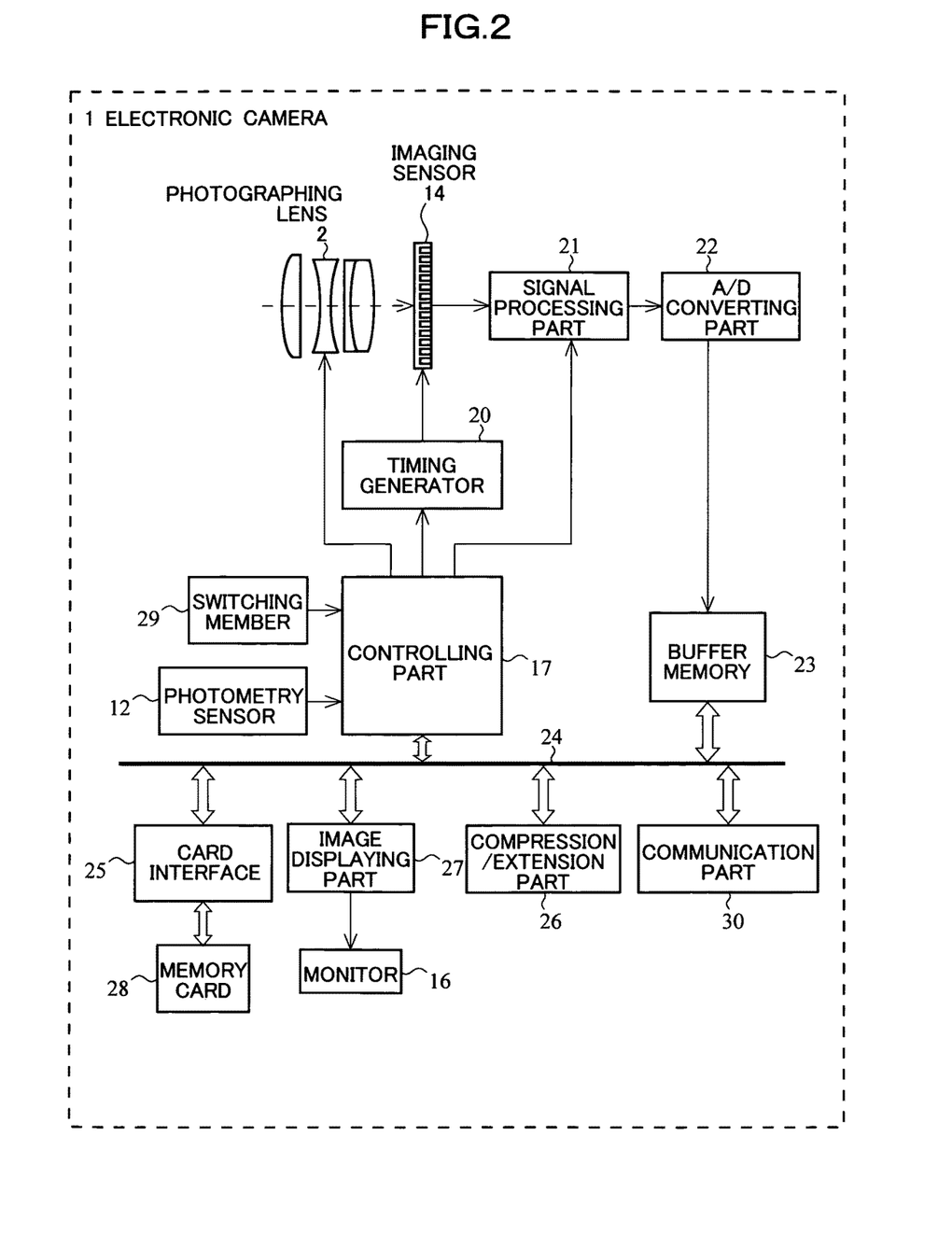
FIG. 2 is a functional block diagram of the electronic camera 1 of the first embodiment.

FIG. 2 illustrates a functional block diagram of the electronic camera 1 of the first embodiment. As shown in FIG. 2, the electronic camera 1 includes, in addition to the arrangement of FIG. 1, a timing generator 20, a signal processing part 21, an A/D converting part 22, a buffer memory 23, a bus 24, a card interface 25, a compression/extension part 26, an image displaying part 27, and a communication part 30. The timing generator 20 supplies output pulses to the imaging sensor 14. In addition, the image data generated by the imaging sensor 14 is temporarily stored in the buffer memory 23 via the signal processing part 21 (including a gain adjusting part corresponding to imaging sensitivity) and the A/D conversion region 22. The buffer memory 23 is coupled to the bus 24. The card interface 25, the controlling part 17 illustrated in FIG. 1, the compression/extension part 26, the image displaying part 27, and the communication part 30 are coupled to the bus 24. The card interface 25 is coupled to a removable memory card 28 and records images to the memory card 28. In addition, a switching member 29 (including a release button and the like which are not shown) of the electronic camera 1, the timing generator 20, and the photometry sensor 12 are coupled to the controlling part 17. Furthermore, the image displaying part 27 displays images or the like on the monitor 16 provided on the back of the electronic camera 1. In addition, the communication part 30 can be mutually coupled with external devices of the electronic camera 1, thereby enabling wireless or wired transmission and reception of a variety of information.

Figure 3:
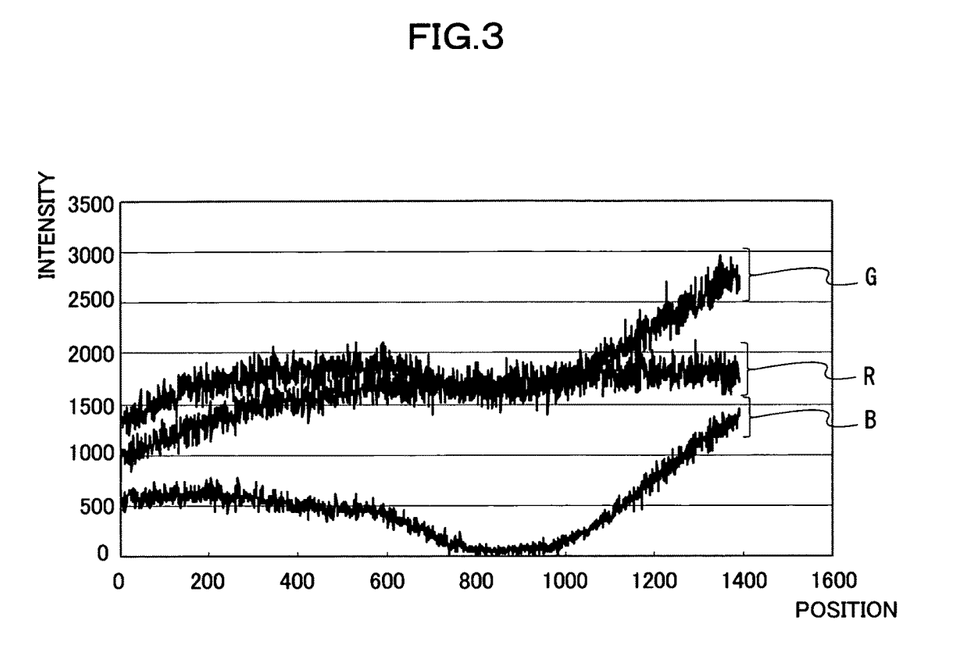
FIG. 3 is a diagram illustrating band-like unevenness.

First, a brief description will be provided with regard to a band-like unevenness due to flickering. FIG. 3 indicates the intensity of respective colors R, G and B when a section is taken along the running direction of the shutter curtain of the shutter 13, for an image obtained by image-capturing a subject having a uniform brightness.

Figure 4:
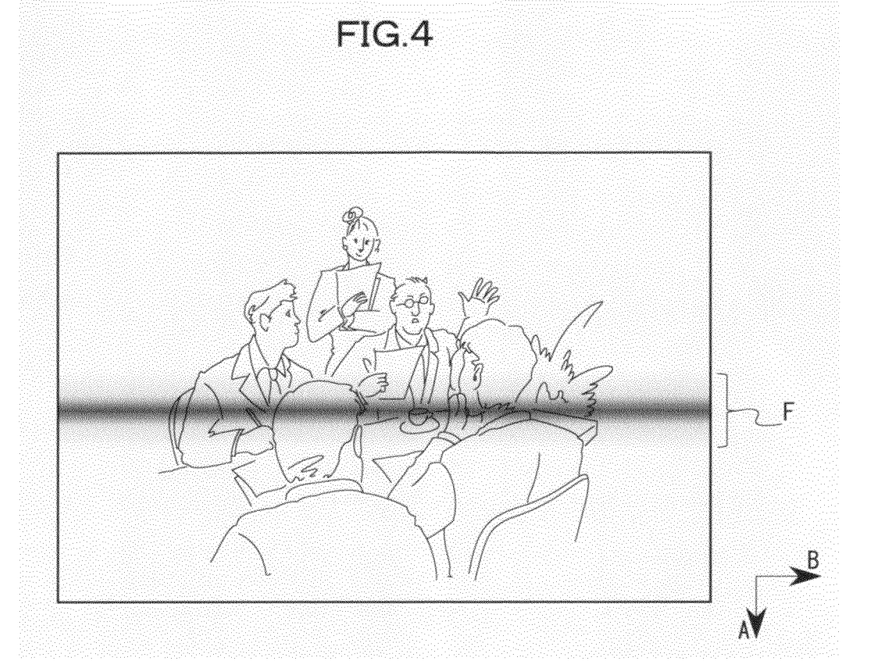
FIG. 4 is another diagram illustrating band-like unevenness.

As shown in FIG. 3, a fall of intensity (output) may occur partially. Such a fall results in a band-like unevenness in the entire image as shown in FIG. 4. This band-like unevenness F occurs along a direction (direction B) substantially perpendicular to the running direction (direction A) of the shutter curtain. Here, in the example of FIG. 4, the band-like unevenness F is emphasized for explanatory purposes.

Next, the operation of the electronic camera 1 when performing image-capturing will be described referring to the flow chart of FIG. 5.

In step S1, when the controlling part 17 receives the user's instruction via the switching member 29 to start the image-capturing, the operation proceeds to step S2.

In step S2, the control part 17 controls respective parts to perform the image-capturing and generates an image.

In step S3, the controlling part 17 determines whether or not the shutter speed is faster than $1/100$ seconds when the image-capturing is performed in step S2. If the shutter speed is faster than $1/100$ seconds, the controlling part 17 determines that the above-mentioned band-like unevenness has occurred, and the operation proceeds to step S4. If, on the other hand, the shutter speed is lower than $1/100$ seconds, the controlling part 17 determines that the band-like unevenness has not occurred, and the operation proceeds to step S9 which will be described below.

Figure 5:
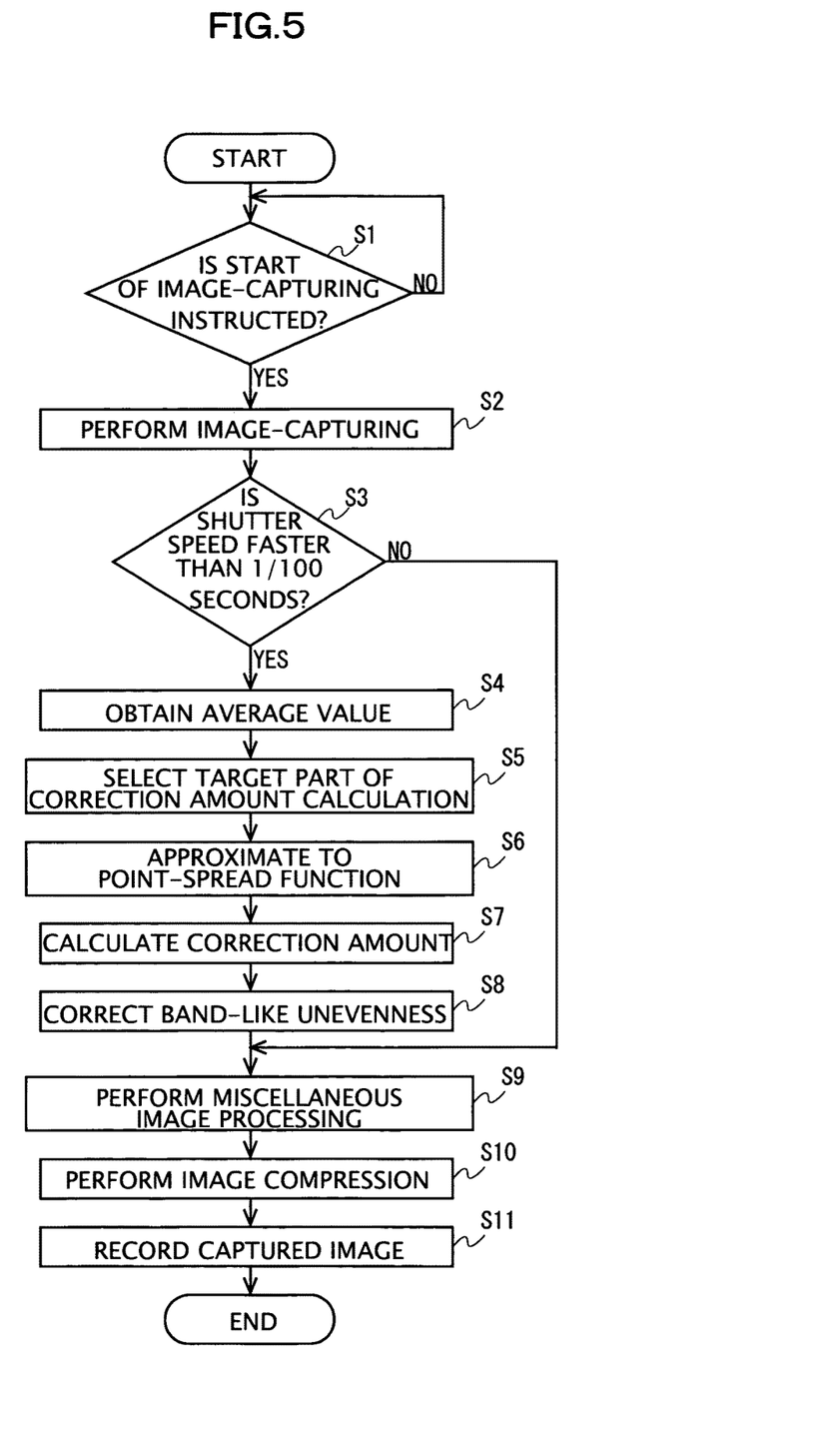
FIG. 5 is a flow chart illustrating operation of the electronic camera 1 when performing image-capturing.
Figure 6:
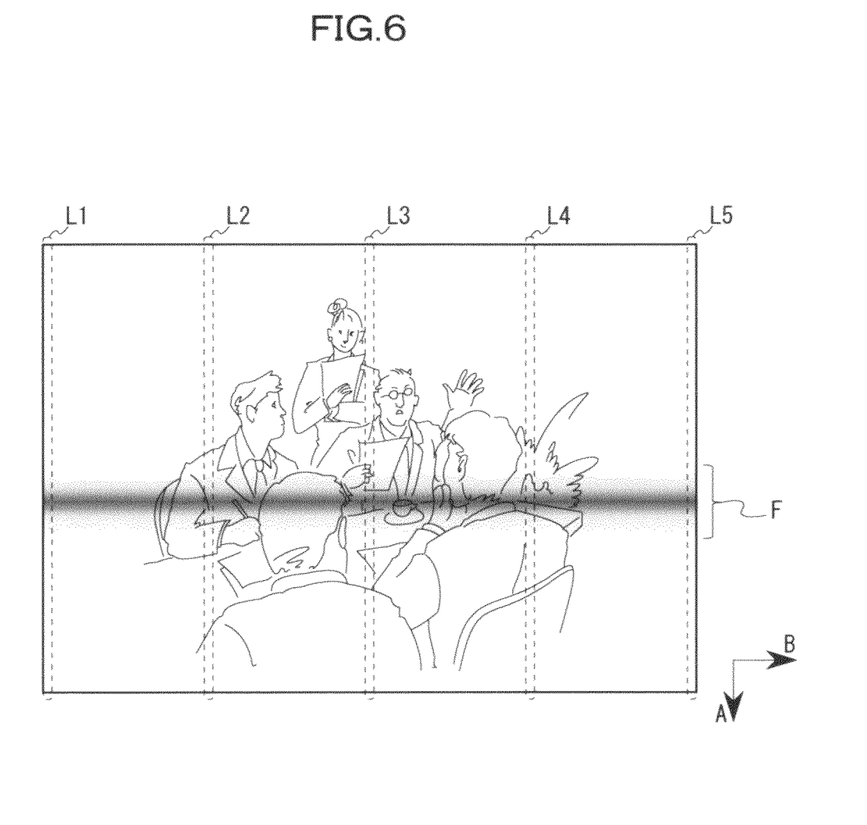
FIG. 6 is a diagram illustrating calculation of the correction amount.

In step S4, the controlling part 17 calculates, from the image generated in step S2, the intensity distribution of the pixel values corresponding to the five lines of pixel column L1-L5 shown in FIG. 6, for each of the color components. L1-L5 are predetermined lines extending along the running direction (direction A) of the shutter curtain.

Here, when the target image is not an image after interpolation, a single line of the imaging sensor 14 does not necessarily include all the color components. For example, in a general Bayer array, only the color components of two colors (R and G, or B and G) are included in a single line. Therefore, it is preferred that the five lines comprise both a line including R and G and a line including B and G.

Figure 7:
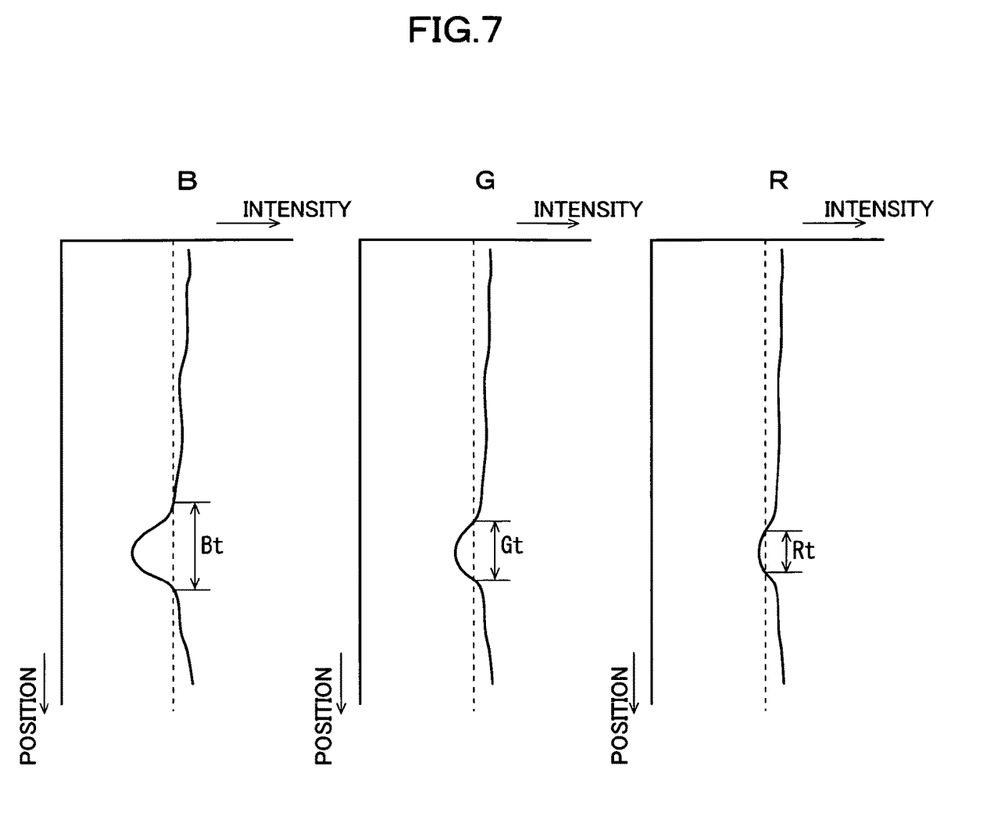
FIG. 7 is another diagram illustrating calculation of the correction amount.

Next, the controlling part 17 obtains, for the B component, the mean value of the pixel values of the pixels existing at the same position along direction A in the five lines. In other words, the mean value of the lines L1-L5 is obtained for each position along direction A. The controlling part 17 similarly obtains the mean value for the G and R components. FIG. 7 illustrates an example of intensity distribution of each color made up of the mean value of the five lines.

In step S5, the controlling part 17 selects, from the intensity distribution of the mean values obtained in step S4, a part (Bt in FIG. 7) where the intensity distribution of the B component is less than the threshold value T. The controlling part 17 similarly compares the G and R components with the threshold value and selects a part (Gt and Rt in FIG. 7) where intensity distribution is less than the predetermined threshold value T.

In step S6, the controlling part 17 approximates the shape of the intensity distribution of the part selected in step S5 to a Point Spread Function (PSF). The control unit 17 performs this approximation for each of the color components too.

In step S7, the controlling part 17 obtains the correction amount Bc, Gc and Rc, respectively, based on the shape of the intensity distribution approximated to the Point Spread Function in step S6. Each correction amount is obtained in the form of a gain required to transform the shape of the intensity distribution of the part selected in step S5 to be substantially flat.

Here, the controlling part 17 obtains each correction amount for each of the color components, as well as for each line pixel column along a direction (direction B) substantially perpendicular to the running direction (direction A) of the shutter curtain. This is because the band-like unevenness is considered to behave in substantially a similar manner along direction B.

In step S8, the controlling part 17 corrects the band-like unevenness based on the correction amount calculated in step S7. The controlling part 17 corrects the band-like unevenness by multiplying the correction amount obtained for each of the color components and for each of the lines of pixel column along direction B with the pixel value of a corresponding pixel.

In step S9, the controlling part 17 performs miscellaneous image processing on the image having the band-like unevenness corrected in step S8. The miscellaneous image processing is known image processing including interpolation, white balance adjustment, color conversion, gradation conversion, or the like.

In step S10, the controlling part 17 controls the compression/extension part 26 and performs compression of the image which has gone through the image processing in step S9.

In step S11, the controlling part 17 records the image data of the image which has gone through the compression processing in step S10 to the memory card 28 via the card interface 25 and terminates the image-capturing.

<Variation>
For Manual Setting:

It may be arranged such that a part of the processing described in the flow chart FIG. 5 is performed based on the user's operation via the switching member 29.

For example, in step S3, although an example is shown in which switching of whether or not to perform correction of the band-like unevenness (corresponding to steps S4 to S8) is performed automatically, the switching may be performed based on the user's operation.

Additionally, in step S5, although an example is shown in which selection of the target part for calculating the correction amount is performed automatically, the selection may be performed based on the user's operation. In addition, the intensity of the band-like unevenness (width of the band-like unevenness), may also be specified based on the user's operation.

In addition, when calculating the correction amount in step S7, the degree of correction may also be specified based on the user's operation.

For step S3:

In step S3, although an example is shown in which switching of whether or not to perform correction of the band-like unevenness (corresponding to steps S4 to S8) is performed by determining whether or not the shutter speed is faster than ¹⁄₁₀₀ seconds when the image-capturing is performed in step S2, this step may be omitted and correction of the band-like unevenness may be always performed. In addition, the light source when performing image-capturing in step S2 may be determined based on information with regard to the white balance adjustment, and it may be switched based on the result of determination whether or not to correct the band-like unevenness is performed.

For step S4:

In step S4, although an example is shown in which intensity distributions of the pixel values corresponding to the pixel column of the five lines L1-L5 shown in FIG. 6 are obtained respectively, the number of lines is not limited to this example provided that there is at least one line. Additionally, although an example is shown in which a plurality of lines is substantially equally-spaced in the example of FIG. 6, the embodiments of the present invention is not limited to this example.

Additionally, in step S4, although an example is shown in which the mean value is obtained, other representative values such as the median may be employed.

Additionally, in step S4, although an example is shown in which the mean value of pixel values is obtained for each of the color components, the mean value may be obtained for each of the ratio of each color component. For example, the mean value may be obtained for R/G and B/G, respectively.

As shown in FIG. 3, there is almost no variation of intensity (output) with the R component. Therefore, the band-like unevenness can be corrected by correcting other color components together with the R component. In other words, considering that almost no band-like unevenness has occurred with regard to the R component, the mean value of R/G and B/G is calculated instead of calculating the mean value of the pixel values for each of the color components. Then, a similar processing is performed on and after step S5. In other words, the correction amount may be calculated such that the ratios of intensity (output) between the G and R components, and the B and R components, become constant when a section is taken along the running direction of the shutter curtain of the shutter 13.

For step S5:

In step S5, although an example is shown in which the target part of calculating the correction amount is selected by comparing with a predetermined threshold value T, the shutter speed when performing the image-capturing in step S2, or the running speed of the shutter curtain of the shutter 13 may also be taken into account at the time of selection.

In addition, the processing of step S5 may be omitted and the entire intensity distribution of the mean value obtained in step S4 may be used for calculating the correction amount.

For step S6:

In step S6, although an example is shown in which the shape of the intensity distribution of the part selected in step S5 is approximated to a Point Spread Function, it may be approximated to other distributions such as a Gauss distribution.

In addition, the processing of step S6 may be omitted and the part selected in step S5 may be simply used for calculating the correction amount.

For step S7:

In step S7, although an example is shown in which the correction amount is calculated by obtaining a gain so that the shape of the intensity distribution of the part selected in step S5 becomes substantially flat, there may be an arrangement in which a gain is obtained so as to relax the shape of the intensity distribution of the part selected in step S5.

In addition, when calculating the correction amount in step S7, it may be arranged such that the degree of correction can be changed as appropriate. For example, the degree of correction may be changed according to the shutter speed when performing the image-capturing in step S2, or according to the running speed of the shutter curtain of the shutter 13 to calculate the correction amount tailored for the degree of correction.

In addition, when calculating the correction amount in step S7, information with regard to white balance adjustment may be taken into account. For example, the light source when performing the image-capturing in step S2 may be determined to change the degree of correction based on the result of determination. More specifically, with regard to a light source having a strong flickering such as a white fluorescent lamp or a mercury lamp, it is preferable to increase the degree of correction. In addition, intensity and color information of the band-like unevenness may be estimated, based on the information with regard to white balance adjustment, to reflect the result of estimation for the calculation of the correction amount.

Additionally, in step S7, although an example is shown in which the correction amount is obtained for each pixel column of the lines along a direction (direction B) substantially perpendicular to the running direction (direction A) of the shutter curtain, the image to be processed may be appropriately divided into blocks so that the correction amount may be obtained for each block.

Furthermore, a limit value may be provided for the correction amount when calculating the correction amount in step S7. As shown in FIG. 3, with the variation of intensity (output) being particularly large in the B component, the intensity may result in zero. Accordingly, the S/N may be degraded by performing correction based on the correction amount calculated in step S7. Therefore, a limit value may be provided to the correction amount in order to address such a case. The limit value may be a predetermined value, or may be obtained according to the shutter speed when performing the image-capturing in step S2 or the running speed of the shutter curtain of the shutter 13. Table 1 shows an example of limit values according to the shutter speed and the running speed of the shutter curtain.

TABLE 1

| Speed of the shutter curtain | shutter speed | | | | | | |
|---|---|---|---|---|---|---|---|
| | 1/100 or less | 1/125 | 1/250 | 1/500 | 1/1000 | 1/2000 | 1/4000 or more |
| slow | 1 | 1 | 2 | 2 | 4 | 8 | 8 |
| ↑ | 1 | 1 | 2 | 2 | 4 | 8 | 8 |
| | 1 | 1 | 2 | 2 | 4 | 8 | 8 |
| | 1 | 1 | 1 | 2 | 2 | 4 | 8 |
| | 1 | 1 | 1 | 2 | 2 | 4 | 8 |
| ↓ | 1 | 1 | 1 | 2 | 2 | 4 | 8 |
| | 1 | 1 | 1 | 2 | 2 | 4 | 8 |
| fast | 1 | 1 | 1 | 1 | 2 | 4 | 8 |

Each value in table 1 indicates the ratio of the limit value of the correction amount according to the shutter speed and the running speed of the shutter curtain. As shown in table 1, the faster the shutter speed is, the larger the limit value of the correction amount is set, whereas the slower the shutter speed is, the smaller the limit value of the correction amount is set. In addition, the slower the running speed of the shutter curtain is, the smaller the limit value of the correction amount is set, whereas the faster the running speed of the shutter curtain is, the larger the limit value of the correction amount is set. By setting such a limit value of the correction amount, a correction amount suitable for the shutter speed and the running speed of the shutter curtain can be calculated to suppress degradation of the S/N.

For step S8:

In step S8, although an example is shown in which correction of the band-like unevenness is performed as an independent processing, the processing may be combined with other image processing and simultaneously performed. For example, it may be combined with white balance adjustment so that correction of the band-like unevenness and white balance adjustment are simultaneously performed. For example, let R−gain be the gain of the R component and B−gain be the gain of the B component, which will be applied to the white balance adjustment. Then, in step S7, amounts of correction Bc, Gc and Rc are obtained, respectively, so that the ratio between the R and G components is given by R/G=1/R−gain, and the ratio between the B and R components is given by B/R=R−gain/B−gain. Then, in step S8, correction of the band-like unevenness and white balance adjustment can be simultaneously performed based on the amounts of correction Bc, Gc and Rc.

As thus described, according to the first embodiment, a band-like unevenness occurring along a direction substantially perpendicular to the running direction (scanning direction in the imaging sensor) of the shutter curtain in the image-capturing apparatus when performing image-capturing of the image is detected in an image to be processed, and a correction amount to correct the detected band-like unevenness is calculated. Then the band-like unevenness in the image is corrected based on the calculated correction amount. Therefore, the band-like unevenness due to flickering can be corrected with a simple arrangement without having to prepare a plurality of sensors and controlling them in synchronization.

In addition, according to the first embodiment, in the image, the correction amount is calculated based on the intensity distribution, as well as detecting the band-like unevenness based on the intensity distribution in a pixel column of at least one line along the running direction. Therefore, the correction amount can be calculated by a simple operation.

In addition, according to the first embodiment, with the image to be processed being an image made up of a plurality of color components, the correction amount is calculated based on the intensity distribution for each of the a plurality of color components, as well as detecting a band-like unevenness for each of the plurality of color components based on the intensity distribution. Therefore, the optimal correction amount can be calculated for each of a plurality of color components having different characteristics with regard to the band-like unevenness.

In addition, according to the first embodiment, the intensity distribution is approximated to a Point Spread Function or a Gauss distribution, and then the correction amount is calculated based on the intensity distribution after approximation. Therefore, the load of computing the correction amount can be reduced.

In addition, according to the first embodiment, a predetermined limit value is provided for the correction amount. Therefore, the band-like unevenness can be corrected while preventing degradation of the S/N.

In addition, according to the first embodiment, the above-mentioned limit value is determined based on at least one of the shutter speed and the running speed of the shutter curtain in the image-capturing apparatus when performing image-capturing of the image. Therefore, the optimal limit value according to the shutter speed or the running speed of the shutter curtain can be applied.

In addition, according to the first embodiment, in the images, a band-like unevenness is detected based on the intensity distribution for each pixel column of a plurality of lines along the running direction, and the correction amount is calculated based on the intensity distribution for each pixel column of a line along a direction substantially perpendicular to the running direction. Therefore, correction with a higher precision can be realized than uniformly correcting the entire image surface as was the case in the prior art.

In addition, according to the first embodiment, a white balance evaluation value with regard to the image is calculated, and at least one of the intensity and color information of the band-like unevenness is estimated based on the calculated white balance evaluation value, and then the correction amount is calculated based on the result of estimation. Therefore, an optimal correction amount in accordance with the subject can be calculated.

In addition, according to the first embodiment, a white balance evaluation value with regard to the image is calculated, and a second correction amount is calculated based on the correction amount and the white balance evaluation value in order to simultaneously perform correction of the band-like unevenness and white balance adjustment of the image. Then, based on the second correction amount, correction of the band-like unevenness and white balance adjustment of the image are simultaneously performed. Therefore, an optimal correction of the band-like unevenness can be realized together with white balance adjustment.

In addition, according to the first embodiment, the user's operation specifying the degree of correction of the band-like unevenness is accepted, and a correction amount is calculated according to the degree of the accepted correction. Therefore, overcorrection of the band-like unevenness can be prevented.

Although, in the first embodiment, an example is shown in which the shutter 13 is a focal plane shutter disposed in front of the imaging sensor 14, the embodiments of the present invention can be similarly applied to a rolling shutter. However, the imaging sensor 14 in this case is a CMOS.

In addition, although the first embodiment described a single-lens reflex type electronic camera as an example, the embodiments of the present invention can be similarly applied to a so-called compact type electronic camera which does not have an optical viewfinder or a quick return mirror for light path branching.

In addition, although the first embodiment presented an example in which information with regard to the band-like unevenness is obtained from a part of the image generated by the image-capturing and corrected, a special pixel may be disposed within the imaging sensor 14 in order to obtain information with regard to the band-like unevenness. For example, in the imaging sensor 14, a special pixel having a member (diffuser plate, for example) which diffuses the incident light into several pixels coupled thereto is disposed along the running direction of the shutter curtain of the shutter 13. Then, it may be arranged such that the information with regard to the band-like unevenness is obtained based on the output of the special pixel and corrected. Here, it is preferable to dispose the special pixel in the periphery of the imaging sensor 14.

Second Embodiment

In the following, a second embodiment of the present invention will be described referring to the drawings. Here, in the second embodiment, description will be provided with a computer taken as an example.

Figure 8:
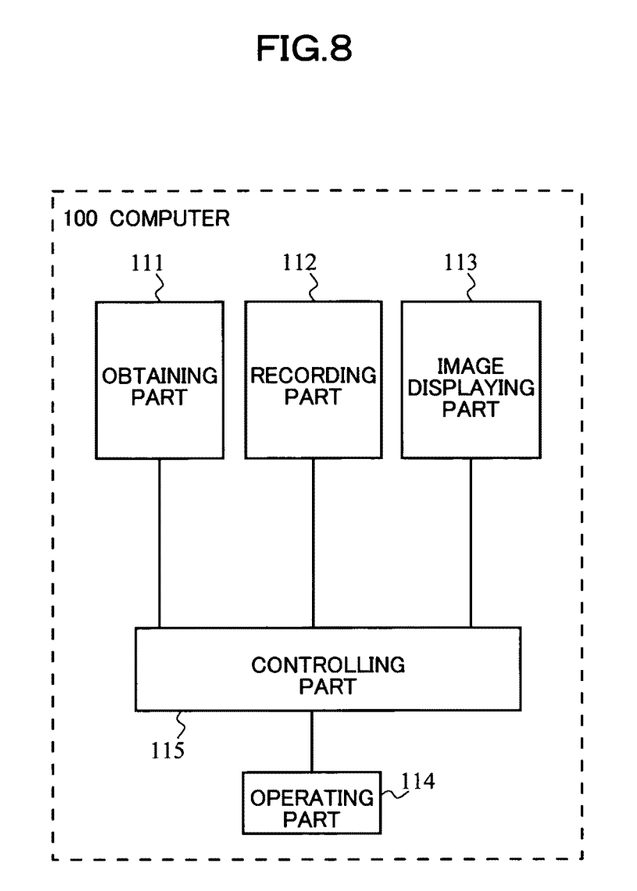
FIG. 8 is a diagram illustrating an arrangement of a computer 100 of a second embodiment.

FIG. 8 illustrates the configuration of a computer 100 of the second embodiment. The computer 100-includes an obtaining part 101, a recording part 112, an image displaying part 113, an operating part 114, and a controlling part 115, as shown in FIG. 8. The obtaining part 101 obtains image data from external devices such as an electronic camera or recording media in a wired or wireless manner or via a drive for recording media. The recording part 112 records image data or the like. The image displaying part 113 includes an image display element such as a liquid crystal display element. The operating part 114 includes a power supply button, a mouse, a keyboard, or the like. The controlling part 115 controls, like the controlling part 17 of the first embodiment, each of other parts performing image processing in a coordinated manner. In addition, the controlling part 115 has a program preliminarily recorded therein for executing each processing.

The CPU 119 has a program recorded therein for executing the processing described in steps S4 to S11 of the flow chart of FIG. 5 of the first embodiment on an image obtained by the obtaining part 101 or an image recorded in the recording part 115.

Then, the controlling part 115 executes a processing similar to that described in steps S4 to S11 of the flow chart of FIG. 5 of the first embodiment. If necessary, however, the obtaining part 101 obtains, in association with the image to be processed, the shutter speed, the running speed of the shutter curtain, the evaluation value with regard to white balance adjustment or the like when the image to be processed is generated.

In addition, as described with the exemplary variation of the first embodiment, the image displaying part 113 may be used when executing a part of the processing based on the user's operation.

Figure 9:
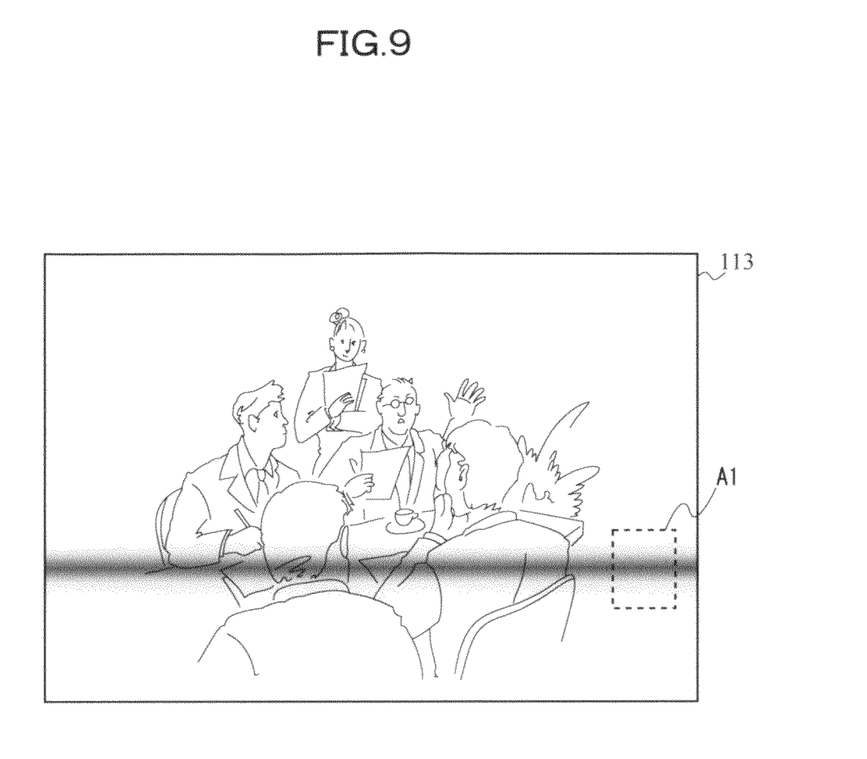
FIG. 9 is a diagram illustrating an exemplary presentation of an image displaying part 113.

For example, in step S5, when selecting, based on the user's operation, a target part of the correction amount calculation, it is possible to specify the intensity of the band-like unevenness (width of the band-like unevenness) by the user's operation of specifying a region such as the region A1 shown in FIG. 9, for example. Similarly, it may be arranged such that a graph corresponding to the intensity distribution of respective colors shown in FIG. 7 is displayed on the image displaying part 113, and the intensity of the band-like unevenness (width of the band-like unevenness), the target part of the correction amount calculation, or the degree of correction can be specified on the graph.

As thus described, according to the computer 100 of the second embodiment, an effect which is similar to that of the first embodiment can be achieved.

Here, in each embodiment, although an example is shown in which the band-like unevenness is corrected for an image corresponding to the so-called RAW data before compression, correction of the band-like unevenness can be similarly performed on an image which has been subjected to JPEG compression or the like.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus comprising:
    a detecting unit which detects, for an image to be input, a band-like unevenness occurring along a direction substantially perpendicular to a scanning direction of an imaging sensor when the image was captured;
    a first calculating unit which calculates, as a first correction amount, a correction amount to correct the band-like unevenness; and
    a correcting unit which corrects the band-like unevenness in the image based on the first correction amount, wherein
    the detecting unit obtains a distribution of pixel values in the scanning direction by using a pixel value of a pixel, out of a plurality of pixels included in the image, included in at least one pixel column along the scanning direction,
    the detecting unit detects, as a pixel column where the band-like unevenness occurs, a pixel column which is along a direction perpendicular to the scanning direction and includes a pixel having a pixel value less than a threshold value from the distribution of pixel values in the scanning direction, and
    the first calculating unit calculates, based on a shape of the distribution of a part where a pixel value is less than the threshold value in the distribution of pixel values in the scanning direction, a first correction amount to correct a pixel value of each pixel included in the pixel column where the band-like unevenness occurs.

2. The image processing apparatus according to claim 1, wherein
    the image is made up of a plurality of color components,
    the detecting unit obtains the distribution of pixel values in the scanning direction for each of the plurality of color components and detects the band-like unevenness using the obtained distribution of pixel values in the scanning direction, and
    the first calculating unit calculates the first correction amount for each of the plurality of color components based on the shape of the distribution of the part where the pixel value is less than the threshold value in the distribution of pixel values in the scanning direction.

3. The image processing apparatus according to claim 1, wherein
    the first calculating unit performs an approximation of the shape of the distribution of the part where the pixel value is less than the threshold value in the distribution of pixel values in the scanning direction to one of a point spread function and a Gauss distribution, and calculates the first correction amount based on the intensity distribution after the approximation.

4. The image processing apparatus according to claim 1, wherein
    the first calculating unit provides a predetermined limit value to the first correction amount.

5. The image processing apparatus according to claim 4, wherein
    the first calculating unit determines the limit value based on at least one of a shutter speed and a running speed of a shutter curtain when the image was captured.

6. The image processing apparatus according to claim 1, wherein
    the detecting unit obtains the distribution of pixel values in the scanning direction by averaging pixel values of pixels arranged in a same pixel column along the direction substantially perpendicular to the scanning direction out of pixels arranged in a plurality of pixel columns along the scanning direction, and detects, as the pixel column where the band-like unevenness occurs, the pixel column which is along the direction perpendicular to the scanning direction and includes the pixel having the pixel value less than the threshold value from the obtained distribution of pixel values in the scanning direction.

7. The image processing apparatus according to claim 1, further comprising
    a second calculating unit which calculates a white balance evaluation value with regard to the image, wherein
    the first calculating unit estimates at least one of the intensity and the color information of the band-like unevenness based on the white balance evaluation value, and calculates the first correction amount based on an estimation result.

8. The image processing apparatus according to claim 1, further comprising:
    a second calculating unit which calculates a white balance evaluation value with regard to the image; and
    a third calculating unit which calculates a second correction amount in order to simultaneously perform correction of the band-like unevenness and white balance adjustment on the image based on the first correction amount and the white balance evaluation value, wherein
    the correcting unit simultaneously performs the correction of the band-like unevenness and the white balance adjustment on the image based on the second correction amount.

9. The image processing apparatus according to claim 1, further comprising
    an accepting unit which accepts user's operation specifying a degree of correction by the first correcting unit, wherein
    the calculating unit calculates the first correction amount according to the degree of correction.

10. An image-capturing apparatus comprising an image processing apparatus according to claim 1, and an imaging sensor.

11. A non-transitory computer readable recording medium storing an image processing program causing a computer to execute an image processing, the image processing program comprising:

a detecting step detecting, for the image to be input, a band-like unevenness occurring along a direction substantially perpendicular to a scanning direction of an imaging sensor when the image was captured;

a calculation step calculating a correction amount to correct the band-like unevenness; and a correcting step correcting the band-like unevenness in the image based on the correction amount, wherein the detecting step has a step obtaining a distribution of pixel values in the scanning direction by using a pixel value of a pixel, out of a plurality of pixels included in the image, included in at least one pixel column along the scanning direction, and a step detecting, as a pixel column where the band-like unevenness occurs, a pixel column which is along a direction perpendicular to the scanning direction and includes a pixel having a pixel value less than a threshold value from the distribution of pixel values in the scanning direction, and the calculating step has a step calculating, based on a shape of the distribution of a part where the threshold value is less in the distribution of pixel values in the scanning direction, a correction amount to correct a pixel value of each pixel included in the pixel column where the band-like unevenness occurs.

12. The computer readable recording medium storing the image processing program according to claim 11, further comprising:

a displaying step displaying the image; and an accepting step accepting user's operation specifying at least one of intensity and width of the band-like unevenness for the image displayed by the displaying step, wherein the calculation step calculates the correction amount based on contents accepted in the accepting step.

* * * * *